(12) United States Patent
Bontu et al.

(10) Patent No.: US 7,899,340 B1
(45) Date of Patent: Mar. 1, 2011

(54) LASER CONTROL IN A COHERENT OPTICAL RECEIVER

(75) Inventors: Chandra Bontu, Nepean (CA); Han Sun, Nepean (CA); Kim B Roberts, Nepean (CA); Kuang Tsan Wu, Kanata (CA)

(73) Assignee: Ciena Corporation, Linthicum, MD (US)

( * ) Notice: Subject to any disclaimer, the term of this patent is extended or adjusted under 35 U.S.C. 154(b) by 600 days.

(21) Appl. No.: 11/279,042

(22) Filed: Apr. 7, 2006

Related U.S. Application Data

(60) Provisional application No. 60/728,751, filed on Oct. 21, 2005.

(51) Int. Cl.
H04B 10/06 (2006.01)
H04B 10/00 (2006.01)

(52) U.S. Cl. .................. 398/209; 398/203; 398/204; 398/206; 398/208

(58) Field of Classification Search .................. 398/154, 398/162, 163, 202, 203, 204, 205, 206, 207, 398/208, 209
See application file for complete search history.

(56) References Cited

U.S. PATENT DOCUMENTS

| | | | |
|---|---|---|---|
| 4,506,388 A | | 3/1985 | Monerie et al. |
| 4,720,827 A | | 1/1988 | Kanaji |
| 4,723,316 A | | 2/1988 | Glance |
| 4,965,858 A | | 10/1990 | Naito et al. |
| 5,414,550 A | * | 5/1995 | Ono .......................... 398/204 |
| 5,422,752 A | * | 6/1995 | Hardcastle .................. 398/187 |
| 5,457,563 A | | 10/1995 | Van Deventer |
| 5,473,463 A | | 12/1995 | Van Deventer |
| 5,995,512 A | | 11/1999 | Pogue et al. |
| 6,473,222 B2 | | 10/2002 | Hait et al. |
| 6,493,131 B1 | * | 12/2002 | Tarng et al. .................. 359/326 |
| 6,607,311 B1 | | 8/2003 | Fishman et al. |
| 6,782,211 B1 | | 8/2004 | Core |
| 7,177,343 B1 | * | 2/2007 | Citta et al. .................. 375/139 |
| 7,209,664 B1 | * | 4/2007 | McNicol et al. ............. 398/135 |
| 2002/0012152 A1 | | 1/2002 | Agazzi et al. |
| 2002/0186435 A1 | | 12/2002 | Shpantzer et al. |

(Continued)

FOREIGN PATENT DOCUMENTS

EP 1453239 A1 9/2004

(Continued)

OTHER PUBLICATIONS

Isaac Shpantzer, Ph.D., "A New Generation of Coherent ULH Fiber-Optic Communication", CeLight Inc., 40 G Workshop, OECC-2002 Conference, Yokohama, Japan, Jul. 8, 2002, pp. 1-14.

(Continued)

*Primary Examiner*—Ken N Vanderpuye
*Assistant Examiner*—Daniel G Dobson
(74) *Attorney, Agent, or Firm*—Kent Daniels; Blake, Cassels & Graydon LLP

(57) ABSTRACT

Methods and systems for compensating a frequency mismatch $\Delta f$ between a local Oscillator (LO) of a coherent optical receiver and a carrier of a received optical signal. An average frequency of the LO is controlled to compensate at least long-period variations of the frequency mismatch. An electrical carrier recovery circuit for compensating short period variations of the frequency mismatch.

30 Claims, 7 Drawing Sheets

U.S. PATENT DOCUMENTS

| | | | |
|---|---|---|---|
| 2003/0063285 A1 | 4/2003 | Pering et al. | |
| 2003/0123884 A1 | 7/2003 | Willner et al. | |
| 2003/0175034 A1 | 9/2003 | Noe | |
| 2003/0197917 A1* | 10/2003 | Yap et al. | 359/330 |
| 2004/0114939 A1 | 6/2004 | Taylor | |
| 2004/0208643 A1* | 10/2004 | Roberts et al. | 398/186 |
| 2005/0196176 A1 | 9/2005 | Sun et al. | |
| 2007/0036555 A1* | 2/2007 | Chen et al. | 398/188 |

FOREIGN PATENT DOCUMENTS

| | | |
|---|---|---|
| GB | 2214381 A | 8/1989 |
| WO | WO 00/60776 A1 | 10/2000 |
| WO | WO 02/027994 A1 | 4/2002 |

OTHER PUBLICATIONS

Isaac Shpantzer, Ph.D. et al., "Coherent Optical Fiber Communication Architecture, Modeling and Optimization", CeLight Inc., SCEE 2002 Conference, Eindhoven, The Netherlands, Jun. 25, 2002, pp. 1-39.

M. Tseytlin et al., "Digital, endless polarization control for polarization multiplexed fiber-optic communications", CeLight Inc., OFC 2003, Mar. 24, 2003, pp. 1-14.

International Search Report for applicant's related International PCT Application PCT/CA2006/001458, Sep. 5, 2006.

International Search Report for applicant's related International PCT Application PCT/CA2006/001459, Sep. 5, 2006.

International Search Report for applicant's related International PCT Application PCT/CA2006/001460, Sep. 5, 2006.

Richard A. Linke, et al., "High-Capacity Coherent Lightwave Systems", Journal of Lightwave Technology, vol. 6, No. 11, Nov. 1988, pp. 1750-1769.

Chul-Ho Shin, et al., "Heterodyne Optical Phase-Locked Loop by Confocal Fabry-Perot Cavity Coupled AlGaAs Laser", IEEE Photonoics Technology Letters, vol. 2, No. 4, Apr. 1990, pp. 297-300.

D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.

Frowin Derr, "Coherent Optical QPSK Intradyne System: Concept and Digital Receiver Realization", Journal of Lightwave Technology, vol. 10, No. 9, Sep. 1992, pp. 1290-1296.

D.-S. Ly-Gagnon, et al., "Unrepeatered optical transmission of 20 Gbit/s quadrature phase-shift keying signals over 210 km using homodyne phase-diversity receiver and digital signal processing", Electronics Letters, vol. 41, No. 4, Feb. 17, 2005, pp. 1-2.

Y. Cia, et al., "On Performance of Coherent Phase-Shift-Keying Modulation in 40 Gb/s Long-Haul Optical Fiber Transmission Systems", OFC, Mar. 2006, pp. 1-3.

Matthias Seimetz, "Performance of Coherent Optical Square-16-QAM-Systems based on IQ-Transmitters and Homodyne Receivers with Digital Phase Estimation", OFC, Mar. 2006, pp. 1-10.

U. Koc, et al., Digital Coherent Phase-Shift-Keying (QPSK), OFC, Mar. 2006, pp. 1-3.

Satoshi Tsukamoto, et al., "Coherent Demodulation of Optical 8-Phase Shift-Keying Signals Using Homodyne Detection and Digital Signal Processing", OFC, Mar. 2006, pp. 1-3.

Kazuro Kikuchi, "Coherent Detection of Phase-Shift Keying Signals Using Digital Carrier-Phase Estimation", OFC, Mar. 2006, pp. 1-3.

B. Spinnler, "Chromatic Dispersion Tolerance of Coherent Optical Communications Systems With Electrical Equalization", OFC, Mar. 2006, pp. 1-3.

R.I. Killey, et al., "Electronic dispersion compensation by signal predistortion", OFC, Mar. 2006, pp. 1-3.

Satoshi Tsukamoto, et al., "Unrepeated 20-Gbit/s QPSK Tansmission over 200-km Standard Single-Mode Fiber Using Homodyne Detection and Digital Signal Processing for Dispersion Compensation", OFC, Mar. 2006, pp. 1-3.

S. Calabro, et al., "An electrical polarization-state controller and demultiplexer for polarization multiplexed optical signals", ECOC-IOOC, Sep. 2003, pp. 1-2.

Reinhold Noe, "Phase Noise-Tolerant Synchronous QPSK/BPSK Baseband-Type Intradyne Receiver Concept With Feedforward Carrier Recovery", Journal of Lightwave Technology, vol. 23, No. 2, Feb. 2005, pp. 802-808.

Reinhold Noe, "PLL-Free Synchronous QPSK Polarization Multiplex/Diversity Receiver Concept With Digital I&Q Baseband Processing", IEEE Photonics Technology Letters, vol. 17, No. 4, Apr. 2005, pp. 887-889.

Ezra Ip, et al., "Carrier Synchronization for 3-and 4-bit-per-Symbol Optical Transmission", Journal of Lightwave Technology, vol. 23, No. 12, Dec. 2005, pp. 4110-4124.

Yan Han, et al., "Coherent optical communication using polarization multiple-input-multiple-output", Optics Express, vol. 13, No. 19, Sep. 19, 2005, pp. 7527-7534.

L.E. Franks, "Carrier and Bit Synchronization in Data Communication-A Tutorial Review", IEEE Transactions on Communications, vol. COM-28, No. 8, Aug. 1980, pp. 1107-1121.

M. Cavallari, et al., "Electronic Signal Processing for Differential Phase Modulation Formats", OFC 2004, pp. 1-3.

A. Farbert, et al., "Performance of a 10.7 Gb/s Receiver with Digital Equaliser using Maximum Likelihood Sequence Estimation", ECOC 2004, Proceedings PD-Th4.1.5, Stockholm, pp. 1-2.

Yusuke Ota, et al., "High-Speed, Burst-Mode, Packet-Capable Optical Receiver and Instantaneous Clock Recovery for Optical Bus Opearation", Journal of Lightwave Technology, vol. 12, No. 2, Feb. 1994, pp. 325-331.

\* cited by examiner

LASER CONTROL IN A COHERENT OPTICAL RECEIVER

CROSS-REFERENCE TO RELATED APPLICATIONS

This application claims benefit under 35 U.S.C. 119(e) from U.S. Provisional Patent Application Ser. No. 60/728,751, entitled Automatic Gain Control, which was filed on Oct. 21, 2005.

TECHNICAL FIELD

The present invention relates to optical communications networks, and in particular to methods and systems for laser control in a coherent optical receiver.

BACKGROUND OF THE INVENTION

In the optical communications space, receivers based on coherent detection techniques have suffered disadvantages that have, to date, prevented successful deployment in "real-world" installed communications networks. One such limitation is that both the transmitted carrier signal and the local oscillator signal are generated by respective Tx and LO lasers, which, in the case of "real world" network systems, will be compact fiber or semi-conductor lasers which are subject to manufacturing and environmental variations. FIG. 1 schematically illustrates principal components and operations of a conventional semi-conductor laser of the type commonly used in communications networks.

As may be seen in FIG. 1, a conventional semi-conductor laser 2 comprises a laser diode 4 driven by a drive signal 6 supplied by a driver circuit 8. The laser diode 4 emits coherent light which is coupled into an optical waveguide 10. The frequency (or, equivalently, wavelength) of the emitted light is typically a non-linear function of the drive signal current and laser diode temperature. Other factors may also affect the frequency, depending of the design of the laser diode 4. In general, the driver circuit 8 receives a frequency setting signal 12 indicative of a desired laser frequency, and generates the drive signal current that is required to obtain this frequency. For ease of understanding the concepts, it is useful to consider a feedback loop 14 which taps the optical waveguide 10 and samples a small portion (e.g. −20 dB) of the laser diode output, enables the driver circuit 8 to dynamically adjust the laser drive signal 6 to minimize the error between a desired and actual frequencies. In the illustrated arrangement, the feedback loop 14 includes an optical frequency reference, such as an optical etalon, which is used to measure the frequency of the tapped laser diode output. With this type of arrangement, the feedback-loop 14 and driver circuit 8 cooperate to form an optical frequency locked loop (FLL) for controlling the laser diode 4. Real implementations of these reference concepts can use free space optics or back facet light to achieve efficient packages. The frequency setting 12 can take any of a number of forms. In some cases, the frequency setting 12 is a multi-bit digital word generated by an external controller unit (not shown in FIG. 1). An equivalent analog signal may also be used. Alternatively, the output frequency of the laser 2 can be controlled by varying parameters such as the temperature or injection current of the laser diode 4. Multistage sources can have several parameters such as phase shifts, couplings, currents, gains, losses, shifts, beats, injections or reflections to achieve frequency control.

In either of these cases, the frequency setting signal 12 may be replaced by one or more suitable analog or digital control signals, which are indicative of a desired target parameter value.

A limitation of semiconductor lasers typically used in optical communications system is that the laser diode 4 control loop (i.e. the driver 8 and feed-back loop 14) is typically designed such that the average output frequency (over a period of 100 s of milliseconds or more) is moderately stable at a value which is nominally fixed by the frequency setting 12. A reference measurement device is not completely accurate nor stable, and deviates with perturbations such as varying temperature or mechanical deformation or aging.

Moreover, the driver 8 and feed-back loop 14 response is normally too slow to prevent short period frequency excursions due to laser linewidth, phase noise, and especially mechanical, optical or electrical transients. As a result, frequency variations of as much to ±400 MHz, at rates on the order to 50 KHz are commonly encountered. In a coherent optical receiver system, this problem is typically addressed by implementing an optical frequency locked loop (FLL) or Phase locked loop (PLL) to actively control the receiver's LO to match the received carrier signal. FLL and PLL circuits for this purpose are described in: "High Capacity Coherent Lightwave Systems", Linke et al, Journal of Lightwave Technology, Vol. 6, No. 11, November 1988; "Heterodyne Phase Locked Loop by Confocal Fabry-Perot Cavity Coupled AlGaAs lasers", Shin et al, IEEE Photonics Technology Letters, Vol. 2, No. 4, April 1990; and "Carrier Synchronization for 3- and 4-bit-per-Symbol Optical Transmission", Ip et al, Journal of Lightwave Technology, Vol. 23, No. 12, December 2005. These systems operate to drive the receiver's LO to precisely track excursions of the received optical carrier. A limitation of this approach is that for optical communications systems with multi-gigabit line rates, an optical PLL/FLL loop bandwidth on the order of hundreds of MHz is needed to effectively compensate the laser phase noise. This is difficult to achieve at acceptable cost.

Heterodyne methods control the local laser to produce a target intermediate frequency carrier in the optical mixing product, and then use microwave electrical methods to beat that intermediate signal down to base-band. Heterodyne methods suffer from the requirement that the intermediate frequency be far from zero, indeed greater than the signal bandwidth, at least doubling the bandwidth required of the electrical receiver.

A newer approach is to use a complex electrical carrier recovery circuit for detecting and compensating a small frequency mismatch between the LO and received carrier. A complex carrier recovery circuit designed for this purpose is described in "Phase Noise-Tolerant Synchronous QPSK/BPSK Baseband-Type Intradyne Receiver Concept With Feedforward Carrier Recovery", R Noé, Journal of Lightwave Technology, Vol. 23, No. 2, February 2005. A limitation of electrical carrier compensation in this manner is that it can only feasibly compensate some aspects of moderate frequency errors. As a result, a large frequency transient can cause severe performance degradations, for example due to limited analog amplifier bandwidth, and clock recovery issues.

A further limitation of prior art systems, is that they are highly vulnerable to optical impairments of the received carrier signal. In particular, in "real world" optical communications systems, optical dispersion on the order of 30,000 ps/nm and polarization rotation transients at rates of $10^5$ Hz are commonly encountered. In the presence of such severe optical distortions, known LO synchronization and/or carrier recovery techniques tend to fail due, at least in part, to: failure of clock recovery and insufficient loop bandwidth of the Laser PLL/FLL and/or electrical carrier recovery circuits.

Accordingly, methods and techniques that enable Local Oscillator (LO) laser control in a coherent receiver unit of an optical communications network remain highly desirable.

SUMMARY OF THE INVENTION

An object of the present invention is to provide improved methods for compensating a frequency mismatch Of between a local Oscillator (LO) and a carrier of a received optical signal, in a coherent receiver of an optical communications network.

Thus, an aspect of the present invention provides a method of compensating a frequency mismatch Of between a local Oscillator (LO) of a coherent optical receiver and a carrier of a received optical signal. An average frequency of the LO is controlled to compensate at least long-period variations of the frequency mismatch. An electrical carrier recovery circuit for compensating short period variations of the frequency mismatch.

A purpose of laser control is to reduce the frequency mismatch $\Delta f$ to zero or near to zero. Due to the response time of the laser, this is not generally feasible to achieve over all periods; i.e. from sub-nanosecond to minutes. Advantageously, the present invention keeps the average frequency mismatch near zero for intervals longer than a few seconds. Short-period deviations, with periods on the order of nanoseconds to milliseconds, can be compensated by the electrical carrier recovery block, and thus may be readily tolerable.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and techniques that enable Local Oscillator (LO) laser control in a coherent receiver unit of an optical communications network. Embodiments of the present invention are described below, by way of example only, with reference to FIGS. 2-5.

Applicant's co-pending U.S. patent applications Ser. Nos. 11/315,342 and 11/315,345 filed Dec. 23, 2005, the entire contents of both of which are hereby incorporated herein by reference, teach methods and systems for robust clock recovery in the presence of moderate to severe dispersion and polarization. Applicant's U.S. patent application Ser. No. 11/366,392, entitled Carrier Recovery in a Coherent Optical Receiver, filed Mar. 3, 2006, which issued to U.S. Pat. No. 7,606,498 on Oct. 20, 2009, the entire contents of which are hereby incorporated herein by reference, teaches methods and systems for robust carrier recovery in the presence of moderate to severe optical impairments of the received optical signal. Taken together, these systems enable accurate electrical carrier recovery and symbol detection, even with significant frequency mismatch between the LO and received carrier frequencies, and in the presence of moderate to severe optical impairments.

In general, the present invention divides the task of compensating frequency mismatch between a Local Oscillator (LO) control loop and electrical carrier recovery block. Thus, the electrical carrier recovery circuit is implemented to compensate short period frequency mismatch transients resulting from LO phase noise. The LO control loop is implemented to compensate laser linewidth and frequency drift, and so maintains the short-period frequency mismatch transients within the pull-in range of the electrical carrier recovery circuit. Dividing frequency mismatch compensation functionality in this manner increases the range of frequency mismatch that can be compensated within the coherent receiver, while at the same time relaxing the bandwidth performance (and thus the cost) of either laser frequency control (i.e. PLL/FLL) or electrical carrier recovery loops if implemented alone.

Figure 2:
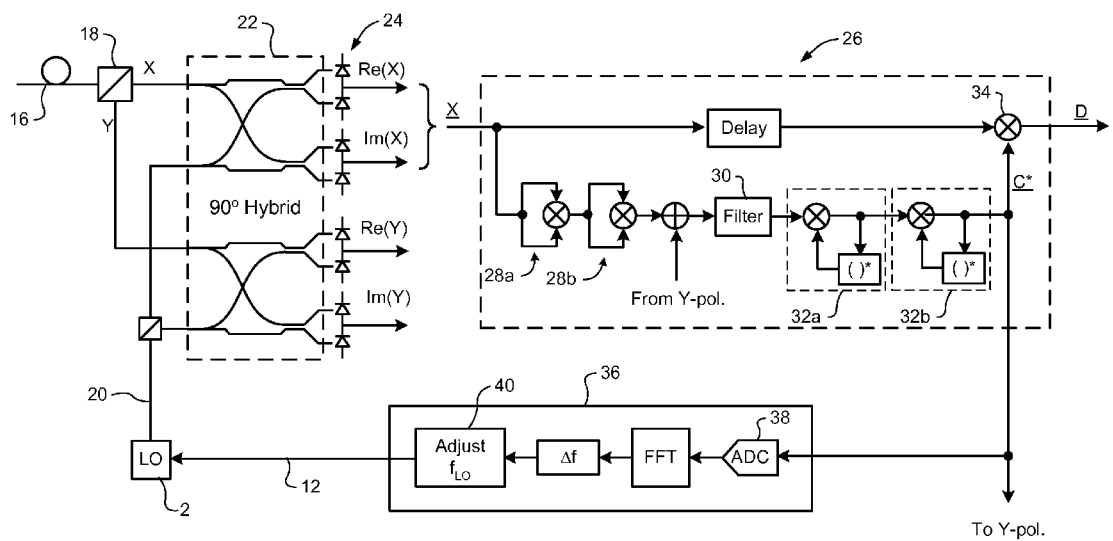
FIG. 2 is a block diagram schematically illustrating principal elements and operations of a coherent optical receiver including a laser control circuit in accordance with a first embodiment of the present invention.

In the coherent optical receiver of FIG. 2, an optical signal received through an optical link 16 is divided by a polarization beam splitter 18 into orthogonal polarizations (nominally referred to as X and Y polarizations in FIG. 2), which are then mixed with a local oscillator (LO) signal 20 through a quadrature 90° optical hybrid 22. The composite optical signals appearing at the output of the hybrid 22 are made incident on a set of photodetectors 24 to generate analog electrical signals Re(X), Im(X), Re(Y), Im(Y) respectively corresponding to real (Re) and imaginary (Im) parts of each polarization. The analog polarization signals $\underline{X}$ (=Re(X)+jIm(X)) and $\underline{Y}$(=Re(Y)+jIm(Y)) are then supplied to a respective carrier recovery circuit 26, which, for the purposes of discussion, follows the pattern of Noé (supra). For simplicity of illustration, only the carrier recovery circuit 26 for the received X-polarization is shown in FIG. 2, it being understood that the carrier recovery circuit for the Y-polarization will be substantially identical. As shown in FIG. 2, the carrier recovery circuit 26 utilizes cascaded frequency doublers 28 (such as Gilbert multiplier cells) which serve to remove data modulation (e.g., QPSK) and increase the X-polarization carrier frequency by a factor of four. A filter 30 is used to remove out-of-band noise, and cascaded regenerative frequency dividers 32 are used to divide the frequency of the filtered signal by four to obtain a complex recovered carrier signal $\underline{C^*}$, which is then mixed (at 34) with the complex polarization signal $\underline{X}$ to obtain a complex baseband signal $\underline{D}$. Downstream processing (not shown) can be used to compensate polarization effects, and detect data encoded within the analog baseband signal D.

The present invention exploits the realization that the complex recovered carrier signal C* is an intermediate frequency (IF) signal centered at the frequency mismatch (or offset) Δf between the received carrier signal and the LO signal 20. Accordingly, an LO control loop 36 can be implemented by sampling the complex recovered carrier signal C*, and digitally processing the sample stream to determine the frequency mismatch Δf. In the embodiment of FIG. 2, this is accomplished by sampling (at 38) the complex recovered carrier signal C*, at a sample rate of, for example, about double the maximum anticipated frequency mismatch, to generate corresponding digital carrier signal. The spectrum of the digital carrier signal is then analysed (e.g. using a Fast Fourier Transform-FFT) to identify the center frequency of the dominant (or strongest) frequency component. This center frequency can then be used as an estimate of the frequency mismatch Δf, and used to incrementally adjust at 40 the LO frequency setting $f_{LO}$ 12. With this arrangement, the LO frequency setting $f_{LO}$ 12 can be progressively adjusted to drive the frequency mismatch Δf toward zero.

The adjustment step size may be a programmable value selected to obtain desired loop response characteristic, and so ensure stability of the LO 2. The adjustment direction may be determined from the sign of the frequency mismatch Δf, and/or the slope of the control loop response. If desired, calculation of the frequency mismatch Δf can include averaging a plurality of successively calculated center frequency values. This implements a low-pass filter operation which damps short period frequency mismatch transients due to LO phase noise, and improves stability of the LO control loop 36.

Figure 3:
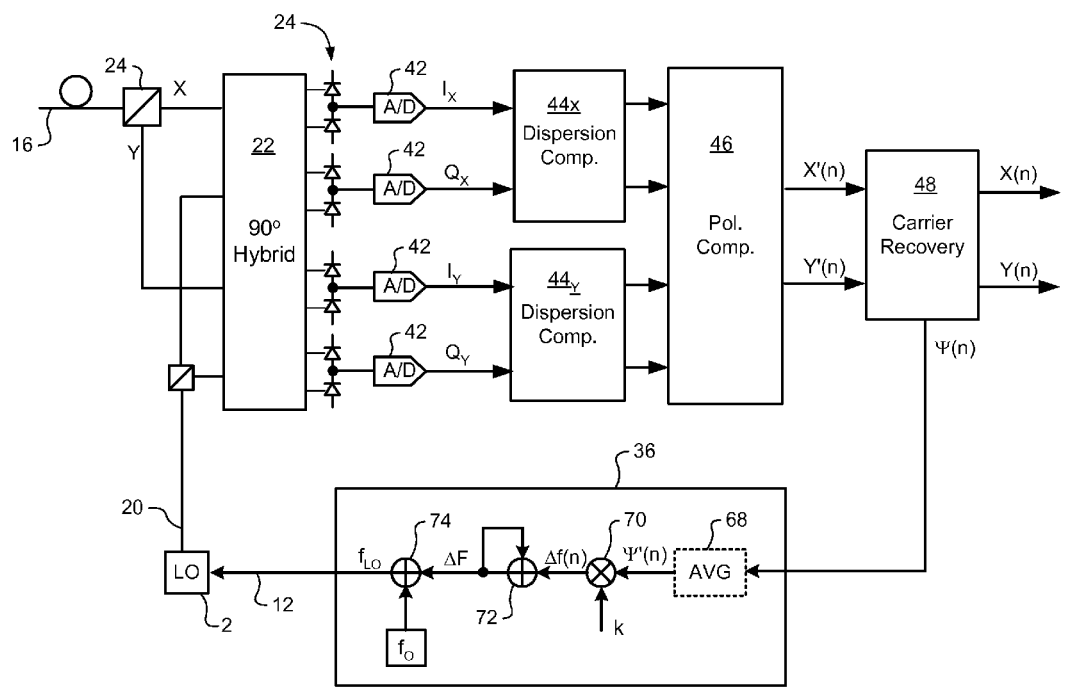
FIG. 3 is a block diagram schematically illustrating principal elements and operations of a coherent optical receiver including a laser control circuit in accordance with a second embodiment of the present invention.
Figure 4:
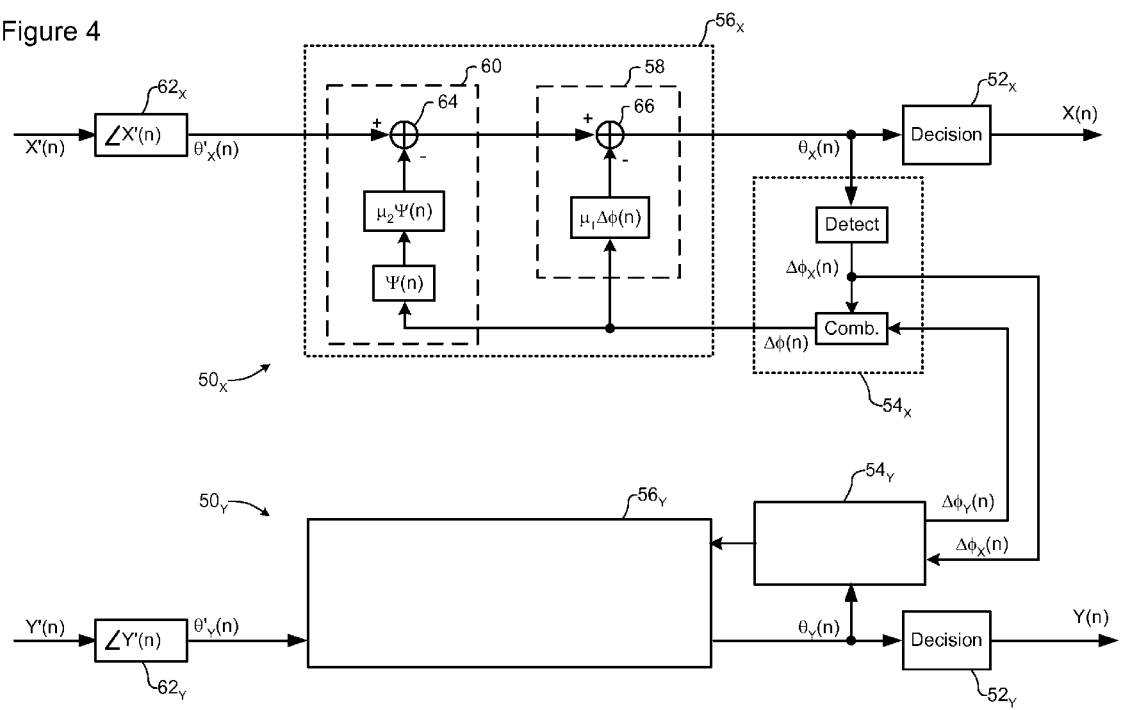
FIG. 4 is a block diagram schematically illustrating principal elements and operations of the carrier recovery block of the coherent optical receiver of FIG. 3.

A limitation with the embodiment of FIG. 2 is that its performance is constrained by the limitations of analog carrier recovery circuit 26. In particular, the analog carrier recovery circuit is only capable of successfully generating a complex recovered carrier signal C* within a comparatively narrow frequency mismatch range. In addition, the accuracy of the complex recovered carrier signal C* is sensitive to impairments (e.g. dispersion, polarization dependent loss, etc.) of the received optical signal. In a moderate to high impairment environment such as can be encountered in installed optical communications networks, the analog carrier recovery circuit 26 may fail. Clearly, such a failure will impact the ability of the LO control loop 36 to properly steer the LO frequency. FIGS. 3-4 illustrate alternative embodiments of the invention, which overcome these limitations.

In the coherent optical receiver of FIG. 3, an inbound optical signal is received through an optical link 16, split into orthogonal polarizations by a Polarization Beam Splitter 18, and then mixed with a Local Oscillator (LO) signal 20 by a conventional 90° hybrid 22. The composite optical signals emerging from the optical hybrid 22 are supplied to respective photodetectors 24, which generate corresponding analog signals. The analog photodetector signals are sampled by respective Analog-to-Digital (A/D) converters 42 to yield multi-bit digital sample streams corresponding to In-phase (I) and Quadrature (Q) components of each of the received polarizations.

From the A/D converter 42 block, the I and Q sample streams of each received polarization are supplied to a respective dispersion compensator 44, which operates on the sample stream(s) to compensate chromatic dispersion. Various methods are known for performing this function, such as, for example Finite Impulse Response (FIR) filters.

The dispersion-compensated sample streams appearing at the output of the dispersion compensators 44 are then supplied to a polarization compensator 46 which operates to compensate polarization effects, and thereby de-convolve transmitted symbols from the complex sample streams output from the dispersion compensators 44. If desired, the polarization compensator 46 may operate as described in Applicant's co-pending U.S. patent application Ser. No. 11/294,613 filed Dec. 6, 2005. Thus, for example, the polarization compensator 46 may be configured as one or more Finite Impulse Response (FIR) filters implementing an Inverse Jones matrix. The output of the polarization compensator 46 is a pair of multi-bit symbol estimates X'(n) and Y'(n) containing both amplitude and phase information of each transmitted symbol. In some embodiments, the symbol estimates X'(n) and Y'(n) are 10-bit digital values, comprising 5-bits for each of the real and imaginary parts. These estimated symbol values include phase error due to the frequency mismatch between the Tx and LO frequencies, laser linewidth and phase noise.

The polarization compensator 46 outputs are then supplied to a digital carrier recovery block 48, which performs carrier recovery and phase error correction, and symbol determination, in accordance with Applicant's U.S. patent application Ser. No. 11/366,392, entitled Carrier Recovery in a Coherent Optical Receiver, filed Mar. 3, 2006, which issued to U.S. Pat. No. 7,606,498 on Oct. 20, 2009, the entire contents of which are hereby incorporated herein by reference.

In general, the carrier recovery block 36 described in Applicant's U.S. Pat. No. 7,606,498, is divided into two substantially identical processing paths 50; one for each transmitted polarization. As may be seen in FIG. 4, each processing path 50 receives a respective output of the polarization compensator 46, and outputs recovered symbols of its respective transmitted polarization. For ease of illustration, only the X-polarization processing path is shown, it being understood that the Y-polarization processing path is substantially identical. Each processing path 50 includes a decision circuit 52 and a carrier recovery loop comprising a carrier phase detector 54 and a phase rotator 56. In general, the phase rotator 56 uses a carrier phase estimate generated by the carrier phase detector 54 to compute and apply a phase rotation κ(n) to the symbol estimates X'(n) received from the polarization compensator 46. The decision circuit 52 uses the phase-rotated symbol estimates X'(n) $e^{-j\kappa(n)}$ to generate the recovered symbol values X(n), and the phase detector 54 operates to detect the phase error Δϕ between the rotated symbol estimate X'(n) $e^{-j\kappa(n)}$ and the corresponding recovered symbol value X(n). Embodiments of each of these blocks will be described in greater detail below.

In general, the carrier recovery loop computes the phase rotation κ(n) which compensates phase errors of the symbol estimates X'(n) and Y'(n). In the illustrated embodiment, this is accomplished by implementing first and second order carrier recovery functions 58 and 60, respectively. Thus, for example, each successive value of the phase rotation κ(n) may be computed using a function of the form:

$$\kappa(n+1) = \kappa(n) + \mu_1 \Delta\phi(n+1) + \mu_2 \Psi(n+1);$$

where: the first-order term $\mu_1 \Delta\phi(n+1)$ relates to the phase difference between the rotated symbol estimate and the corresponding recovered symbol; and the second order term $\mu_2 \Psi(n+1)$ is derived from a frequency mismatch parameter ψ(n) which models the frequency mismatch Δf between the received carrier and the LO laser. As will be appreciated, the first order term will vary from symbol-to-symbol, and therefore reflects the effects of phase noise of the Tx and LO lasers.

As will be described in greater detail below, the second order term integrates phase differences over time, and thus is a comparatively slow-varying value which follows laser frequency excursions but is otherwise relatively insensitive to phase noise. The scaling factors $\mu_1$ and $\mu_2$ may be programmable, and define the respective phase adjustment step size for each term.

FIG. 4 illustrates an embodiment in which the phase computations are based on the fact that QPSK/BPSK symbols have a constant amplitude (nominally "1") so that the correct symbol values can be recovered from the symbol estimates X'(n) and Y'(n) by analysing only their phase information. Accordingly, the symbol estimates X'(n) are analysed (at 62) to determine their respective phase angles $\theta'_x(n)$. With the symbol estimates X'(n) converted into the phase-domain in this manner, further phase rotations to compensate the total phase error estimate κ(n) can be accomplished by simple addition/subtraction blocks 64 and 66.

In the embodiment of FIG. 4, the rotator 56 comprises first and second order phase rotation blocks 58 and 60. The first order phase rotation block 58 uses each successive symbol phase error Δϕ(n) to compute the first order phase rotation term $\mu_1 \Delta\phi(n+1)$ which compensates short-period phase jitter. The scaling factor $\mu_1$ may be selected based on a desired adjustment step size. For example, in an embodiment in which the symbol phase estimate θ'(n) is a 8-bit digital word, the smallest possible adjustment step size is $$\frac{2\pi}{2^8} = 0.025 \text{(rad)} = 1.4°.$$

Larger step sizes can be obtained by suitable selection of the scaling factor $\mu_1$.

The second order phase rotation block 60 operates to compute and apply phase rotations due to the frequency mismatch Δf between the Tx and LO lasers. One way of accomplishing this is to compute the frequency mismatch parameter ψ(n) by accumulating successive symbol phase errors, thus Ψ(n+1)=Ψ(n)+Δϕ(n+1). The frequency mismatch parameter ψ(n+1) is multiplied by $\mu_2$ (the $2^{nd}$-order control parameter) to obtain the second order phase rotation $\mu_2\Psi(n+1)$.

As noted above, the frequency mismatch parameter ψ(n) computed by the second order phase rotation block 60 is a multi-bit estimate of the frequency mismatch Δf between the received carrier and the LO. Accordingly, in the embodiment of FIG. 3, ψ(n) is used by the LO control loop 36 to steer the LO.

Figure 1:
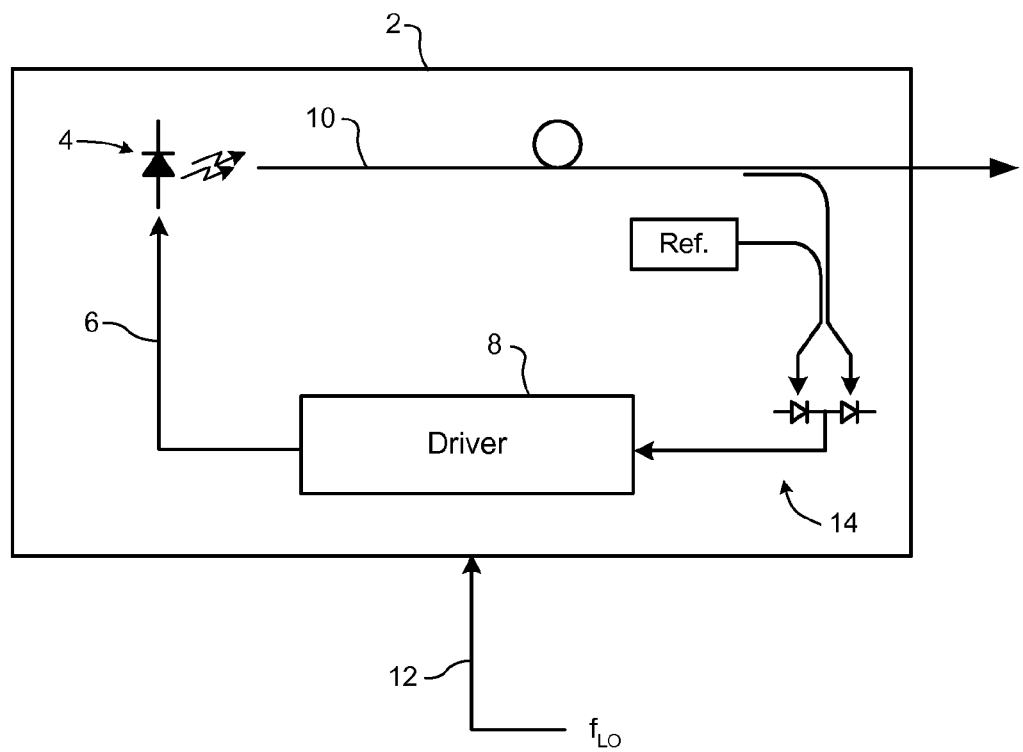
FIG. 1 is a block diagram schematically illustrating principal elements of a semiconductor laser known in the prior art.

In some embodiments, the loop response of the second order phase rotation block 60 is selected such that the frequency mismatch parameter values ψ(n) will track frequency excursions at rates of 50 KHz or more. In many cases, this means that the frequency mismatch parameter ψ(n) will be moving too rapidly for the laser control loop 36 (FIG. 3) or driver 8 (FIG. 1) to track. This can be overcome by averaging (at 68) the successive frequency mismatch parameter values ψ(n) (0≦n≦N) to yield a low-pass filtered mismatch parameter ψ'(n) in which variations above a few 100 s of Hertz, for example, are suppressed. An advantage of this approach is that the frequency mismatch parameter ψ(n) calculated by the second order phase rotation block 60, and thus the filtered mismatch parameter ψ'(n) already contains the sign of the frequency mismatch. As a result, the filtered mismatch parameter values ψ'(n) can be scaled (at 70) to obtain the corresponding frequency mismatch Δf(n), which can then be used directly to adjust the LO frequency setting $f_{LO}$. In the embodiment of FIG. 3, this is accomplished by accumulating (at 72) successive corresponding frequency mismatch values Δf(n) to obtain a frequency adjustment ΔF, which is then combined with a default LO frequency setting $f_O$ (at 74) to obtain the frequency setting $f_{LO}$ supplied to the LO 2. This arrangement has an advantage that the default LO frequency setting $f_O$ will be automatically used during start-up of the receiver. As a result, the initial frequency mismatch will normally be limited to the known performance tolerances of the Tx and LO lasers, and the carrier recovery block 48 designed to guarantee capture and pull-in of the received carrier within these tolerances.

Figure 5:
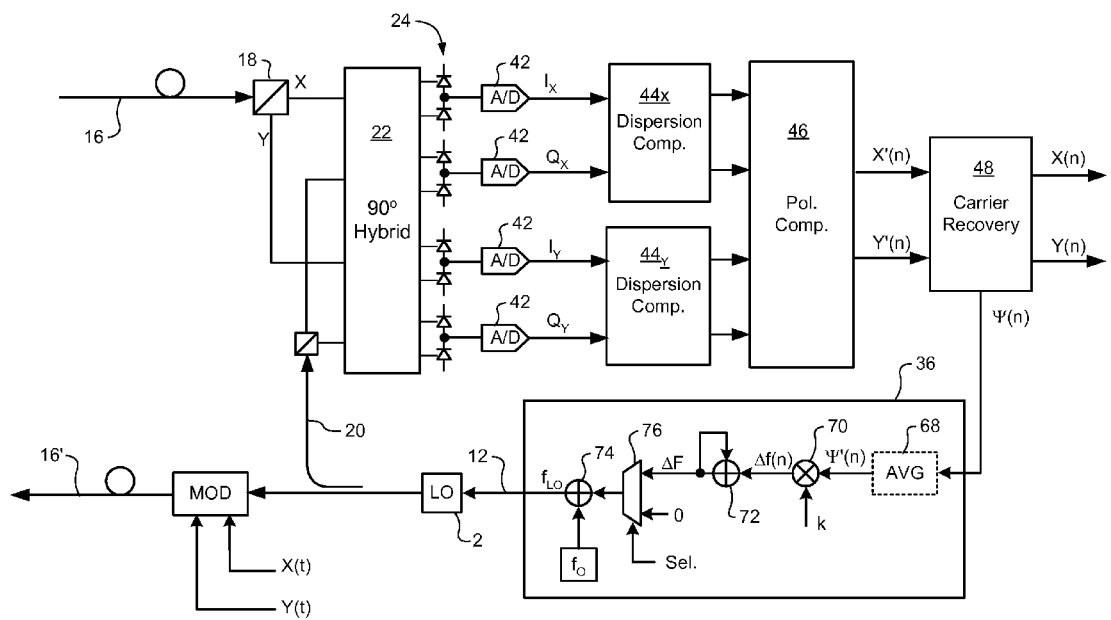
FIG. 5 is a block diagram schematically illustrating principal elements and operations of a coherent optical receiver including a laser control circuit in accordance with a third embodiment of the present invention.

FIG. 5 illustrates a coherent optical receiver of the type illustrated in FIG. 3, except that in the embodiment of FIG. 5 the LO 2 is used for both coherent reception of optical signals received from a transmitter of a remote site (not shown), and for transmission of data signals X(t) and Y(t) to a receiver of the remote site. In this case, the LO control loop 36 includes a selector switch 76 which operates to selectively enable/disable the LO frequency adjustment functionality. This can be useful for ensuring stability of the TX/Rx units at opposite ends of the optical link 16. For example, in an optical communications system in which optical modems in accordance with FIG. 5 are used at both ends of the optical link 16, each modem is capable of tuning its LO frequency to match the received carrier, but doing so also adjusts its Tx carrier, and so will cause the modem at the remote site to try to adjust its LO frequency to match. The result is that both modems will "chase" each other continuously, and may be unable to converge to a stable operating frequency. The ability to selectively disable the LO frequency adjustment functionality avoids this problem by allowing one modem to hold its LO (and thus its Tx carrier) frequency setting $f_{LO}$ constant. The other modem can then enable its LO frequency adjustment functionality and so match its LO frequency to that of the other modem.

Figure 6:
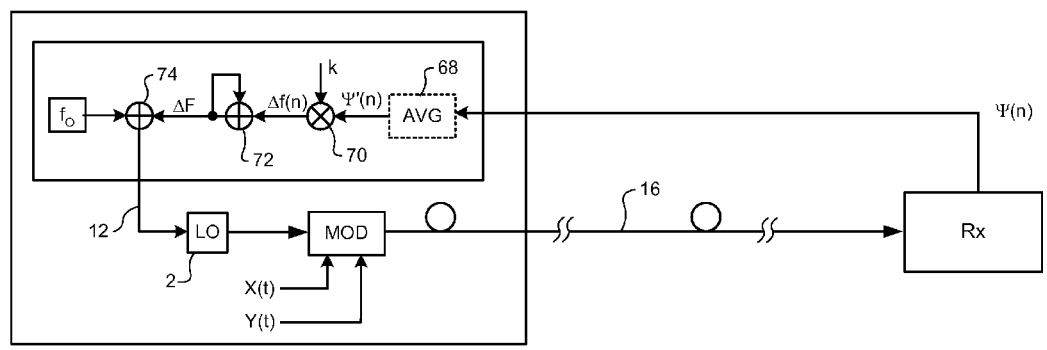
FIG. 6 is a block diagram schematically illustrating principal elements and operations of an optical communications system in accordance with an embodiment of the present invention.

In the foregoing embodiments, the LO control block 36 is used to steer the average frequency of the LO signal to match the received carrier. It will be appreciated that a closely similar method may be used to control the carrier frequency at the transmitter end. Some applications may need a small, but non-zero target for the frequency difference. Thus, for example, the frequency mismatch parameter ψ(n) (or, equivalently, the frequency mismatch Δf) may be sent to a transmitter end of the link, and used to steer the transmitter LO, as shown in FIG. 6. In cases where the transmitter includes a complex optical synthesizer of the type described, for example, in Applicant's co-pending U.S. patent application Ser. No. 10/677,223 filed Oct. 3, 2003, which issued to U.S. Pat. No. 7,023,601 on Apr. 4, 2006, the frequency mismatch parameter ψ(n) (or, frequency mismatch value Δf(n)) can be used by the optical synthesizer to precompensate at least a portion of the frequency mismatch. This latter solution allows the transmitter LO to be controlled as nearly as possible to a constant output frequency, and signal distortions due to laser phase noise at both the Tx and Rx ends of the link electrically compensated by the complex optical synthesizer.

Figure 7:
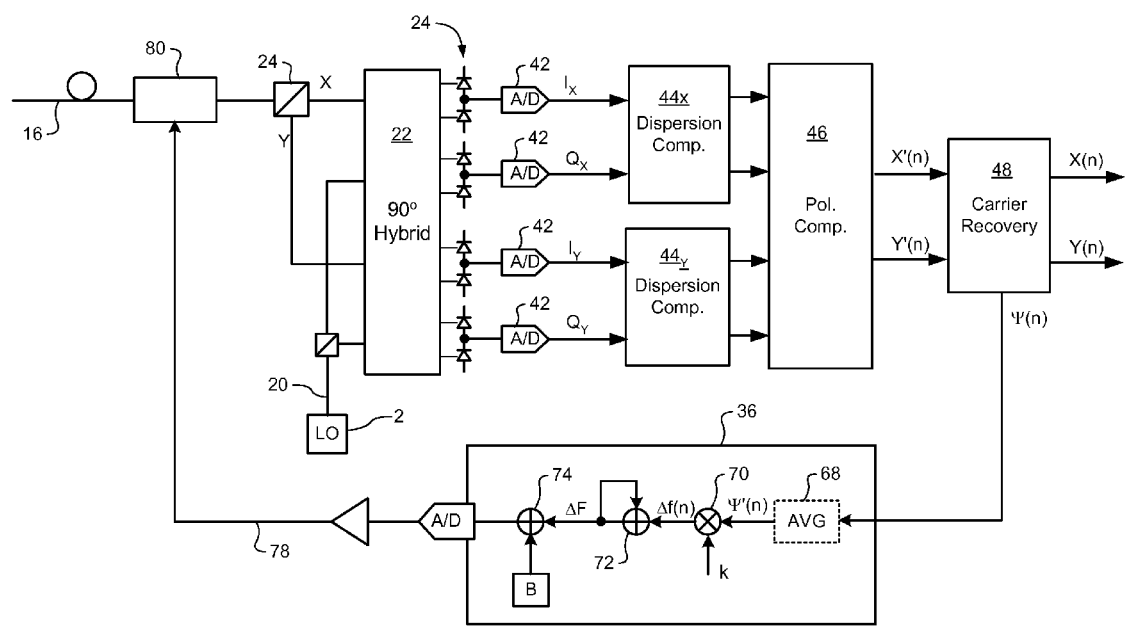
FIG. 7 is a block diagram schematically illustrating principal elements and operations of a coherent optical receiver in accordance with a further embodiment of the present invention.

A still further alternative approach is to employ an electro-optical device upstream of the receiver to compensate the frequency mismatch, as shown in FIG. 7. Thus, for example, the LO control block 36 of FIG. 3 may be suitably modified so as to generate a control signal 78 (which may be an analog voltage level) use to control an electro-optic frequency shifter 80 of a type known in the art. Such elements use techniques such as modulation or optical nonlinearities. In this case, the default frequency FO used in the embodiment of FIG. 3 is replaced by a bias setting B, so that the frequency offset ΔF drives variations of the control signal 78 (and thus the magnitude of the frequency shift impose on the inbound carrier) about a median value determined by the bias setting.

The embodiments of the invention described above are intended to be illustrative only. The scope of the invention is therefore intended to be limited solely by the scope of the appended claims.

We claim:

1. In a communications system comprising a transmitter and a coherent optical receiver, a method of compensating a frequency mismatch Δf between a carrier of an optical signal transmitted by the transmitter and a local Oscillator (LO) of the receiver, the method comprising:
    a carrier recovery circuit of the receiver digitally processing dispersion compensated symbol estimates recovered from the optical signal to compute a frequency mismatch parameter indicative of the frequency mismatch, and to compensate short period variations of the frequency mismatch; and
    a control loop controlling an average frequency of at least one of the LO and the carrier, using the frequency mismatch parameter, to at least partially compensate long-period variations of the frequency mismatch.

2. A method as claimed in claim 1, wherein the step of controlling an average frequency of at least one of the LO and the carrier comprises steps of:
    obtaining a digital parameter value indicative of the frequency mismatch; and
    adjusting a frequency setting of either one or both of the LO and the carrier based on the digital parameter value.

3. A method as claimed in claim 2, wherein the step of adjusting a frequency setting of either one or both of the LO and the carrier comprises steps of:
    sending the digital parameter value to the transmitter; and
    controlling a Tx Local Oscillator of the transmitter based on the digital parameter value.

4. A method as claimed in claim 2, wherein the step of adjusting a frequency setting of either one or both of the LO and the carrier comprises steps of:
    sending the digital parameter value to the transmitter; and
    controlling a complex optical synthesizer of the transmitter, based on the digital parameter value, so as to electronically precompensate optical distortions induced by the frequency mismatch.

5. A method as claimed in claim 2, wherein the carrier recovery circuit generates a recovered carrier signal having a dominant frequency component centered at an intermediate frequency corresponding to the frequency mismatch, and wherein the step of obtaining the digital parameter value comprises steps of:
    processing the recovered carrier signal to identify a center frequency of the dominant frequency component; and
    using the identified center frequency as the frequency mismatch parameter.

6. A method as claimed in claim 5, wherein the recovered carrier signal is an analog signal, and wherein the step of processing the recovered carrier signal comprises steps of:
    sampling the analog recovered carrier signal to generate a corresponding digital recovered carrier signal; and
    analysing a spectrum of the digital recovered carrier signal.

7. A method as claimed in claim 6, wherein a sample rate of the digital recovered carrier signal is selected to encompass a maximum expected frequency mismatch.

8. A method as claimed in claim 2, wherein the carrier recovery circuit computes a frequency mismatch parameter that is proportional to the frequency mismatch.

9. A method as claimed in claim 8, wherein the step of obtaining a digital parameter value comprises a step of either one or both of: scaling the frequency mismatch parameter; and low-pass filtering the frequency mismatch parameter.

10. A method as claimed in claim 8, wherein the step of adjusting the LO frequency setting comprises steps of:
    determining a frequency adjustment value; and
    combining the frequency adjustment value with a default frequency setting of the LO.

11. A method as claimed in claim 10, wherein the step of determining a frequency adjustment value comprises a step of accumulating successive frequency mismatch parameter values.

12. A method as claimed in claim 2, further comprising a step of selectively disabling adjustment of the frequency setting of the LO.

13. A method as claimed in claim 2, wherein the step of adjusting a frequency setting comprises the step of adjusting a target parameter of a local laser control method.

14. A method as claimed in claim 13, wherein the target parameter substantially determines the average laser frequency.

15. In a communications system comprising a transmitter and a coherent optical receiver, a system for compensating a frequency mismatch Δf between a carrier of an optical signal transmitted by the transmitter and a local Oscillator (LO) of the coherent optical receiver, the system comprising:
    an electrical carrier recovery circuit at the receiver, the carrier recovery circuit digitally processing dispersion compensated symbol estimates recovered from the optical signal to compute a frequency mismatch parameter indicative of the frequency mismatch, and to compensate short period variations of the frequency mismatch; and
    a control loop for controlling an average frequency of at least one of the LO and the carrier, using the frequency mismatch parameter, to at least partially compensate long-period variations of the frequency mismatch.

16. A system as claimed in claim 15, wherein the control loop comprises:
    means for obtaining a digital parameter value indicative of the frequency mismatch; and
    means for adjusting a frequency setting of at least one of the LO and the carrier, based on the digital parameter value.

17. A system as claimed in claim 16, wherein the means for adjusting a frequency setting of either one or both of the LO and the carrier comprises:
    means for sending the digital parameter value to the transmitter; and
    a controller for controlling a Tx Local Oscillator of the transmitter based on the digital parameter value.

18. A system as claimed in claim 16, wherein the means for adjusting a frequency setting of either one or both of the LO and the carrier comprises steps of:
    means for sending the digital parameter value to the transmitter; and
    a complex optical synthesizer of the transmitter for electronically precompensate optical distortions induced by the frequency mismatch, based on the digital parameter value.

19. A system as claimed in claim 16, wherein the carrier recovery circuit generates a recovered carrier signal having a dominant frequency component centered at an intermediate frequency corresponding to the frequency mismatch, and wherein the means for obtaining the digital parameter value comprises:

a processor for processing the recovered carrier signal to identify a center frequency of the dominant frequency component, the identified center frequency being used as the frequency mismatch parameter.

20. A system as claimed in claim 19, wherein the recovered carrier signal is an analog signal, and wherein the processor comprises:
an Analog-to-Digital (A/D) converter for sampling the analog recovered carrier signal to generate a corresponding digital recovered carrier signal; and
a Fast Fourier Transform Filter (FFT) for analysing a spectrum of the digital recovered carrier signal.

21. A system as claimed in claim 20, wherein a sample rate of the A/D converter is selected to encompass a maximum expected frequency mismatch.

22. A system as claimed in claim 15, wherein the carrier recovery circuit computes a frequency mismatch parameter that is proportional to the frequency mismatch.

23. A system as claimed in claim 22, wherein the means for obtaining a digital parameter value comprises either one or both of: a multiplier for scaling the frequency mismatch parameter; and a filter for low-pass filtering the frequency mismatch parameter.

24. A system as claimed in claim 22, wherein the means for adjusting the LO frequency setting comprises:
means for determining a frequency adjustment value; and
a digital combiner for combining the frequency adjustment value with a default frequency setting of the LO.

25. A system as claimed in claim 24, wherein the means for determining a frequency adjustment value comprises an accumulator for accumulating successive frequency mismatch parameter values.

26. A system as claimed in claim 16, further comprising means for selectively disabling adjustment of the frequency setting of the LO.

27. A system as claimed in claim 16, wherein the LO control loop has a step response longer than one microsecond.

28. A system as claimed in claim 27, wherein the step response is longer than one millisecond.

29. A system as claimed in claim 16, wherein the frequency setting of the LO is adjusted at a rate of less than once per microsecond.

30. A system as claimed in claim 15, wherein the carrier recovery circuit is implemented downstream of at least a dispersion compensation block of the receiver.

* * * * *